US010894372B2

(12) United States Patent
Röthlin et al.

(10) Patent No.: US 10,894,372 B2
(45) Date of Patent: Jan. 19, 2021

(54) CONTACT WELDING HEATING COMPONENT AND AUTOMATIC WELDING MACHINE (71) Applicant: Leister Technologies AG, Kägiswil (CH)

(72) Inventors: Paul Röthlin, Kerns (CH); Roger Bürgler, Ennetbürgen (CH)

(73) Assignee: LEISTER TECHNOLOGIES AG, Kagiswil (CH)

(*) Notice: Subject to any disclaimer, the term of this patent is extended or adjusted under 35 U.S.C. 154(b) by 0 days.

(21) Appl. No.: 16/652,279

(22) PCT Filed: Sep. 28, 2018

(86) PCT No.: PCT/EP2018/076420
§ 371 (c)(1),
(2) Date: Mar. 30, 2020

(87) PCT Pub. No.: WO2019/068574
PCT Pub. Date: Apr. 11, 2019

(65) Prior Publication Data
US 2020/0238631 A1 Jul. 30, 2020

(30) Foreign Application Priority Data
Oct. 6, 2017 (DE) .................. 20 2017 106 063

(51) Int. Cl.
B29C 65/10 (2006.01)
B29C 65/30 (2006.01)
(Continued)

(52) U.S. Cl.
CPC ...... B29C 66/02245 (2013.01); B29C 65/103 (2013.01); B29C 65/20 (2013.01);
(Continued)

(58) Field of Classification Search
CPC .......... B29C 66/8652; B29C 66/86521; B29C 65/103; E04D 15/04
See application file for complete search history.

(56) References Cited

U.S. PATENT DOCUMENTS 5,935,357 A * 8/1999 Hubbard ............. B29C 66/1122
156/497
6,149,762 A * 11/2000 Kobzan ............... B29C 66/0242
156/497
(Continued)

FOREIGN PATENT DOCUMENTS

CN 201175996 Y 1/2009
DE 88 08 693 U1 9/1988
(Continued)

OTHER PUBLICATIONS

International Search Report for corresponding Application No. PCT/EP2018/076420, dated Jan. 22, 2019.
(Continued)

Primary Examiner — Mark A Osele
(74) Attorney, Agent, or Firm — Renner, Otto, Boisselle & Sklar, LLP (57) ABSTRACT A contact welding heating component and to an automatic welding machine for plasticizing the edges of thermally fusible/meltable material sheets disposed so as to overlap at least partially. A roughening device for the material sheets, which is disposed upstream of the trailing-material edge of the heating component in the direction of movement of the contact welding heating component, protrudes beyond the upper side of the heating component and/or the lower side of the heating component, wherein the roughening device extends transversely to the direction of movement of the contact welding heating component, adjoining the trailing-material edge of the heating component, and includes a number of sharp-edged raised roughening elements extend- (Continued)

ing in the direction of movement of the contact welding heating component, preferably having a variable height in the direction of movement of the contact welding heating component. The automatic welding machine includes a contact welding heat component thus designed.

14 Claims, 6 Drawing Sheets

(51) Int. Cl.
  *B29C 65/00* (2006.01)
  *B29C 65/20* (2006.01)
  *E04D 15/04* (2006.01)
(52) U.S. Cl.
  CPC .......... *B29C 66/71* (2013.01); *B29C 66/8652* (2013.01); *E04D 15/04* (2013.01)

(56) References Cited

U.S. PATENT DOCUMENTS

| | | | | |
|---|---|---|---|---|
| 6,537,402 | B2* | 3/2003 | Pate | B29C 66/1122 156/497 |
| 6,973,951 | B2* | 12/2005 | Henegar | B29C 66/1122 156/499 |
| 7,866,360 | B2* | 1/2011 | Gisler | E04D 15/04 156/499 |
| 2002/0189766 | A1 | 12/2002 | Zurmuehle | |
| 2010/0043984 | A1 | 2/2010 | Voney | |

FOREIGN PATENT DOCUMENTS

| | | | |
|---|---|---|---|
| DE | 93 17 104 U1 | 2/1994 | |
| EP | 0 914 935 A2 | 5/1999 | |
| EP | 1 254 759 A2 | 11/2002 | |
| EP | 1 358 993 B1 | 11/2003 | |
| EP | 1884347 A1 | 2/2008 | |
| EP | 2453072 A2 * | 5/2012 | ............ E04D 15/04 |
| WO | 2006117397 A1 | 11/2006 | |

OTHER PUBLICATIONS

International Preliminary Report on Patentability with attachments for corresponding Application No. PCT/EP2018/076420, dated Jan. 7, 2020.

* cited by examiner

CONTACT WELDING HEATING COMPONENT AND AUTOMATIC WELDING MACHINE

TECHNICAL FIELD OF THE INVENTION

The invention relates to a contact welding heating component for plasticizing the edges of thermally fusible/meltable material sheets disposed so as to overlap at least partially, which can be inserted between an overlapped lower material sheet and an overlapping upper material sheet and can be moved along the same, comprising an upper side of the heating component for making contact with the upper material sheet and a lower side of the heating component for making contact with the lower material sheet, including a front leading-material side of the heating component in the direction of movement of the contact welding heating component during the welding operation, and a rear trailing-material edge of the heating component for the material sheets that are joined to one another by way of the upper side of the heating component and the lower side of the heating component, forming a wedge-shaped contour, and comprising at least one roughening device, protruding beyond the upper side of the heating component and/or the lower side of the heating component, for the material sheets that are disposed upstream of the trailing-material edge of the heating component in the direction of movement of the contact welding heating component.

The invention furthermore relates to an automatic welding machine for joining the edges of thermally fusible/meltable material sheets disposed so as to overlap at least partially, comprising a contact welding heating component, which can be inserted between an overlapped lower material sheet and an overlapping upper material sheet for plasticization, and can be moved along the same.

BACKGROUND OF THE INVENTION

Such contact welding heating components are commonly known and are either designed as a hot-air-slot welding nozzle for a hot air welding device or as a hot wedge element including electrical heater for so-called electrical hot wedge welding devices, and as combinations of these heating elements. In the case of hot air welding devices, an air current is heated, for example by an electric heating element or a gas flame, and the hot air thus generated is directed at the material to be fused using a specially configured welding nozzle, wherein the welding nozzle is generally designed as a wedge-shaped slot welding nozzle. In the case of electrical hot wedge welding devices, the electrical hot wedge element for fusing the material is heated electrically, wherein the hot wedge is directly energized and heated by an inserted electrical cartridge heater, or indirectly by way of induction. In both types of contact welding heating components, the contact welding heating component is heated, wherein the upper side of the heating component and lower side of the heating component make contact with the upper and lower material sheets, respectively, during the welding operation, so as to heat the material sheets. Both with the hot air welding device and with the electrical hot wedge welding device, the actual welding operation takes place after fusing/melting of the edges, which is to say plasticization of the material sheets, by compression of the material sheets.

When welding plastic sheets and films, the heated contact welding heating component in question is moved along the edges between the two films to be fused and, in the case of an electrical hot welding wedge, the material is heated solely by the contact with the upper side of the heating component and the lower side of heating component or, in the case of a hot-air-slot welding nozzle, by the hot air exiting the nozzle as well. In the region in which the material overlaps, in which the heating element is guided, for the welding operation, the upper material and the lower material are initially plasticized on the surface and are then integrally joined or welded to one another by way of a downstream pressing roller or cylinder.

When welding soiled or coated material sheets, the quality of the weld seam produced is often unsatisfactory. In this regard, it is known that improved welding can be achieved when the material sheets and films are roughened prior to welding. By way of example, reference shall be made to the published prior art EP 1 254 759 B1, EP 0 914 935 B1, and EP 1 358 993 B1.

EP 1 254 759 B1 discloses a hot-air-slot welding nozzle for welding plastic sheets or films by way of a hot air welding device, comprising an upper side and a lower side, for making contact with the upper and lower plastic sheets or films to be welded to one another, and comprising abrading devices protruding from the surfaces of the upper and lower sides, and including air openings in at least one surface, wherein the abrading devices that protrude from the surfaces include elevations disposed transversely to the welding direction, which are situated at the edges of the air openings and upstream of the air openings in the welding direction. The upper side and/or the lower side has a wedge-shaped design, wherein an electric heater is preferably additionally disposed between the upper side and the lower side.

EP 0 914 935 B1 proposes a hot air welding device for welding plastic sheets, comprising a nozzle that is provided for outputting hot air and has a slot-like opening, which is provided in order to blow hot air between two material sheets to be welded, wherein at least one roller-shaped or cylindrical abrading device is provided upstream of the slot-like opening or downstream thereof, in the working direction, so as to superficially abrade or roughen the surfaces of the material sheets to be welded prior to compression. The abrading device is detachably disposed on a holding member protruding laterally from the slot-like nozzle. The front edge of the abrading device, lying furthest from the nozzle, is disposed parallel to the nozzle opening contour, as viewed from above, wherein upwardly and/or downwardly protruding guide plates or abrasion plates are disposed in the region of the nozzle opening, along which the sheets to be welded are guided or slide prior to welding. In addition, spring-like lamellae are provided, which protrude downwardly or upwardly from the slot-like nozzle opening and are disposed next to one another so as to conform to any contour of the surface to be superficially abraded.

EP 1 358 993 B1 teaches a hot air welding device for welding plastic sheets, comprising a nozzle that is provided for outputting the hot air and has a slot-like opening, which is provided to blow hot air between two material sheets to be welded, wherein at least one roller-shaped or cylindrical abrading unit is provided upstream of the slot-like opening, or downstream thereof, in the working direction, which has a conical or conically tapered design. The abrading device is detachably disposed on a holding member protruding laterally from the slot-like nozzle. The front edge of the abrading device, lying furthest from the nozzle, extends substantially parallel to, or at a slight angle with respect to, the nozzle opening contour, as seen from above.

It has been shown that the above-described prior art does not allow optimal welding to be achieved for poorly weldable material sheets, for example when joining old and new sealing sheets or sealing sheets coated with a non-weldable coating, since the material sheets to be joined undergo only minor fine roughening prior to being welded.

SUMMARY OF THE INVENTION

Proceeding from this, it is the object of the invention to provide an option that results in improved welding quality, even with poorly weldable material sheets, and thereby ensures a sturdy, durable, and preferably permanent, integral bond between the material sheets, which is to say reliable homogeneous joining thereof.

The core idea of the invention is to provide the upper side of the heating component, for making contact with the upper material sheet, and/or the lower side of the heating component, for making contact with the lower material sheet, with a grooved surface area near the rear trailing-material edge of the heating component, for the material sheets, of the contact welding heating component. The grooved surface area is to resemble a screw thread surface, which is to say a surface having profiled notches and sharp-edged blade-like elevations, which extend in a rectilinearly aligned manner in the direction of movement of the contact welding heating component, or of the automatic welding machine. During welding of the material sheets, the two joining regions of the material sheets, which have been heated at the edges, are endowed with multiple notches, preferably laterally offset from one another, by the blades, prior to compression of the edges of the material sheets, whereby the contact surface in the joining regions is increased and, additionally, is shifted away from the surface of the material sheets into the interior of the material sheets. In this way, splined contact surfaces are created for the process of integral joining by way of welding, which are larger than the original planar contact surfaces. Joining the joining regions of the material sheets by way of a pressing cylinder or pressing rollers results, not in a two-dimensional joining seam, but rather in a three-dimensional joining seam. As a result of the splines, the two material sheets can be securely joined to one another at the interior by way of a considerably wider inner joining seam, with the weld seam width visible from the outside remaining the same, whereby the weld quality is also considerably improved for material sheets having a poorly weldable surface. The effective inner joining surface of the material sheets is dependent on the depth and the number of notches created. This splined joining surface may thus be increased without difficulty by up to 50 percent, or even more, compared to a planar joining surface.

In the contact welding heating component according to the invention, which is provided to plasticize the edges of fusible/meltable material sheets disposed so as to overlap at least partially, the roughening device extends transversely to the direction of movement of the contact welding heating component, adjoining the trailing-material edge of the heating component, and comprises a number of sharp-edged, raised, which is to say elevated, roughening elements extending in the direction of movement of the contact welding heating component during the welding operation. The roughening elements do not have to be razor-sharp. What is primarily important is that these are dimensioned so as to be able to penetrate into the material when pressure is applied, which is to say, for example, that the width thereof is small compared to the width of the contact welding heating component. The roughening elements can be parallel to the direction of movement or be inclined by a small angle of up to approximately 30 degrees with respect to the direction of movement.

The contact welding heating component comprises a body having a wedge-shaped design, wherein the upper side of the heating component preferably includes at least one descending region on the body, by way of which the upper material sheet is moved in a contacting manner. Ideally, the upper side of the heating component moreover comprises an ascending region on the body, which is disposed upstream of the descending region in the customary direction of movement of the contact welding heating component. In this way, the upper material sheet is considerably tautened, in particular in conjunction with the trailing pressing cylinder or the trailing pressing rollers. This results in enhanced roughening of the material sheet on the lower side, and in particular, enables deep notching in the first place by the sharp-edged, raised roughening elements of the roughening device which extend in the direction of movement of the contact welding heating component. It has proven to be particularly advantageous to design the lower side of the heating component, along which the lower material sheet is moved in a contacting manner, similarly to the upper side of the heating component, so as to achieve the corresponding advantages there. The roughening device and the roughening elements project beyond the body of the contact welding heating component.

The roughening device and the roughening elements preferably have a variable height in the direction of movement of the contact welding heating component, which is to say, these project vertically to varying degrees from the upper side of the heating component and/or the lower side of the heating component. The roughening device and the roughening elements preferably likewise have a wedge-shaped design, which is to say, these include an ascending region and a descending region, wherein the ascending region is disposed upstream of the descending region in the customary direction of movement of the contact welding heating component. As a result, the material sheets are slideably guided along the sharp-edged blade-like roughening elements without abrasive action and, due to the increase in tautening of the material sheets, the roughening of the material sheets is essentially limited to scoring and notching of the surface.

In a preferred embodiment of the invention, the roughening device and the roughening elements have a maximum height in the direction of the trailing-material edge of the heating component. This means that the ascending region thereof is considerably longer than the descending region thereof. The roughening elements thus apply the desired scoring or notching action to the plasticized edges of the respective associated material sheet across a large region of the roughening device. In an advantageous embodiment of the contact welding heating component according to the invention, the roughening device and the roughening elements have an arcuate progression in the direction of movement of the contact welding heating component.

In a preferred embodiment of the invention, the roughening device and the roughening elements are designed to be interrupted in the direction of movement of the contact welding heating component. In this way, as seen in the indicated direction, the roughening device comprises not only a number of sharp-edged roughening elements disposed next to one another transversely to the direction of movement of the contact welding heating component, but also a number of sharp-edged roughening elements disposed behind one another in the direction of movement of the contact welding heating component. The roughening elements disposed next to one another and/or behind one another can be disposed at least partially aligned with one another or laterally offset from one another.

In a particularly advantageous variant of the contact welding heating component according to the invention, the roughening device and the roughening elements are interrupted perpendicularly to the direction of movement of the contact welding heating component, and preferably have a variable height perpendicularly to the direction of movement of the contact welding heating component. A particularly advantageous embodiment is one in which the height of the roughening device and of the roughening elements decreases from the outside to the inside, perpendicularly to the direction of movement of the contact welding heating component.

In one embodiment of the invention, the contact welding heating component is made of metal and is produced entirely or partially by way of a 3D metal printing method. In another embodiment of the invention, the contact welding heating component is produced entirely, or partially, by way of a laser sintering and/or laser melting method. The contact welding heating component preferably comprises a supporting brace at the interior, between the upper side of the heating component and the lower side of the heating component, so as to increase the compressive strength. In one embodiment of the invention, the contact welding heating component is a hot-air-slot welding nozzle, and in another embodiment, this is an electrical hot welding wedge.

The contact welding heating component according to the invention made of metal can, of course, in general also be produced by way of separating manufacturing methods, such as milling and grinding, shaping manufacturing methods, such as bending and indentation-forming, and/or joining manufacturing methods, such as welding. As a primary shaping process, the 3D printing method has an advantage, compared to these, in that the accuracy or the reproducibility is better, due to the higher degree of automation, and in that more complex geometries can be implemented including, for example, braces at the interior. 3D printing furthermore also has some cost advantages.

A hot-air-slot welding nozzle according to the invention includes a hot air inlet opening, at least one slot-shaped welding air outlet opening, and at least one preheating air outlet opening, for a hot air blast, disposed upstream of the welding air outlet opening, in the direction of movement of the hot-air-slot welding nozzle during the welding operation, wherein the roughening device extends transversely to the direction of movement of the hot-air-slot welding nozzle, adjoining the welding air outlet opening. In a recommended embodiment of the invention, the roughening elements ideally extend from the at least one preheating air outlet opening to the welding air outlet opening. The at least one welding air outlet opening may include one or more openings or channels disposed next to one another and/or on top of one another.

An electrical hot welding wedge according to the invention is electrically heated directly or indirectly, wherein the roughening device extends transversely to the direction of movement of the electrical hot welding wedge, adjoining the trailing-material edge of the heating component.

The automatic welding machine according to the invention for joining the edges of fusible/meltable material sheets disposed so as to overlap at least partially, comprising a contact welding heating component, which can be inserted between an overlapped lower material sheet and an overlapping upper material sheet for plasticization of the material sheets and can be moved along the same, comprises a contact welding heating component as described above.

Summarized briefly, the advantages of the invention are that:

- a much larger weld assembly surface is achieved for the material sheets to be joined than was previously possible;
- oxidation layers are automatically removed or eliminated as a result of roughening;
- seam preparation can be omitted;
- water vapor can escape better when heating material sheets having high moisture, and thus no blisters, or only few blisters, are formed in the weld surface;
- the coatings on coated PVC and TPO material sheets are roughened or removed;
- the maximum weld speed is increased by 10% to 15%;
- a lower welding temperature is made possible;
- the contact welding heating component can be easily produced by a 3D metal printing method;
- the wider weld assembly surface of the material sheets results in greater reliability and a higher tolerance for weld quality;
- permanent sealing of the weld seams is ensured;
- no solvents are needed for pretreating the seam;
- a reduction in the working time is achieved; and
- a decrease in labor and material costs is achieved.

The invention will be described hereafter in greater detail based on exemplary embodiments illustrated in the drawings. Additional features of the invention will be apparent from the following description of the exemplary embodiments of the invention in conjunction with the claims and the accompanying drawings. The individual features of the invention can be implemented either alone or as several together in different embodiments of the invention.

DETAILED DESCRIPTION OF THE INVENTION

Figure 1:
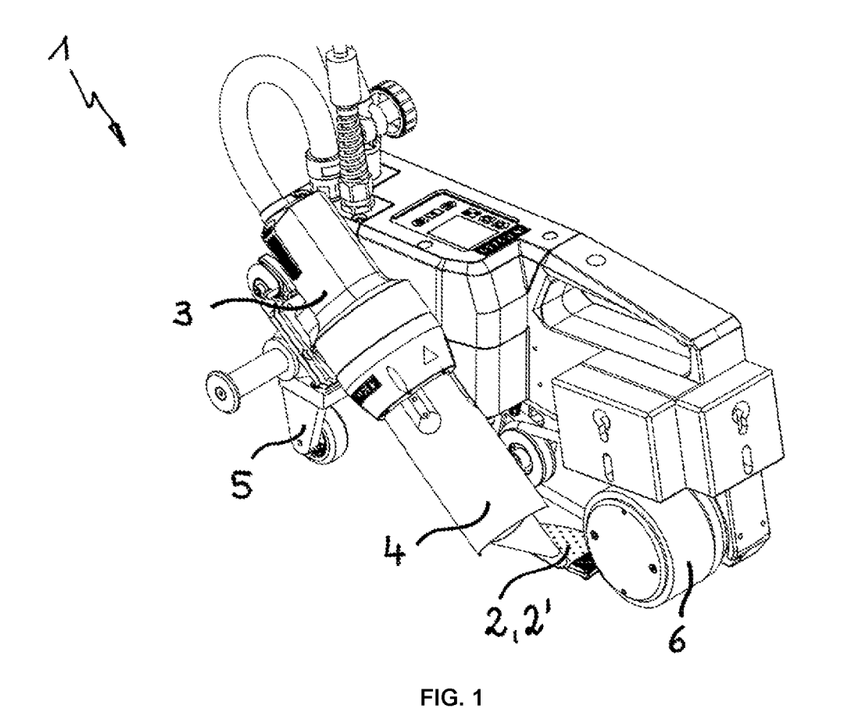
FIG. 1 shows an automatic welding machine according to the invention, which is designed as an automatic hot air welding machine and comprises a contact welding heating component according to the invention in the form of a hot-air-slot welding nozzle, in a perspective view.

FIG. 1 illustrates an automatic welding machine 1 for joining the edges of thermally fusible/meltable material sheets (not shown in the figure) disposed so as to overlap at least partially, comprising a contact welding heating component 2 according to the invention, which can be inserted between the overlapped lower material sheet and the overlapping upper material sheet for plasticization of the material sheets, and which can be moved along the same. The illustrated exemplary embodiment is a self-propelled automatic hot air welding machine 1, comprising a regulatable hot air blower 3, having the contact welding heating component 2 disposed at the end of an air outlet tube 4 thereof, wherein the contact welding heating component 2 is designed as a hot-air-slot welding nozzle 2'. The automatic welding machine 1 is supported by drive rollers 5 and a pressing cylinder 6.

Figure 2:
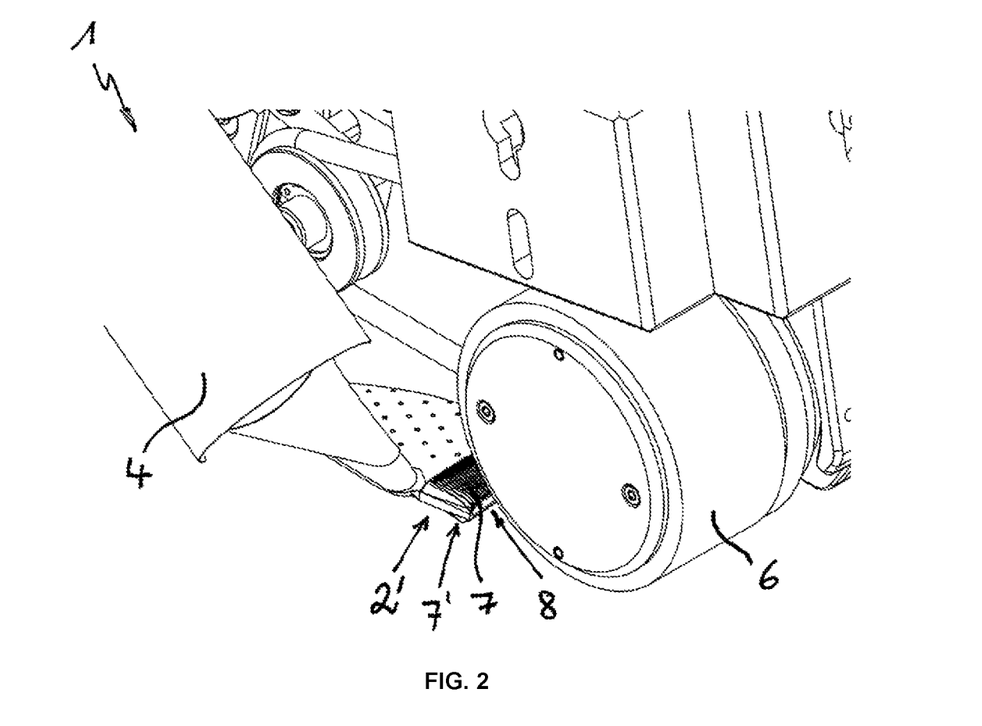
FIG. 2 shows an enlarged section from FIG. 1 in the region of the hot-air-slot welding nozzle.

FIG. 2 shows an enlarged section from FIG. 1 in the region of the hot-air-slot welding nozzle 2'. The hot-air-slot welding nozzle 2' is provided to plasticize the edges of fusible/meltable material sheets (not shown) disposed so as to overlap at least partially and, at the top and bottom, comprises protruding roughening devices 7 and 7' for the material sheets, which are disposed upstream of a trailing-material edge 8 of the heating component in the direction of movement of the contact welding heating component 2. The roughening devices 7, 7' are disposed so as to directly adjoin the trailing-material edge 8 of the heating component and extend transversely to the direction of movement of the contact welding heating component 2. Each comprises a number of sharp-edged raised roughening elements 9 extending in the direction of movement of the contact welding heating component 2, which act on the material sheets during plasticization thereof.

Figure 3:
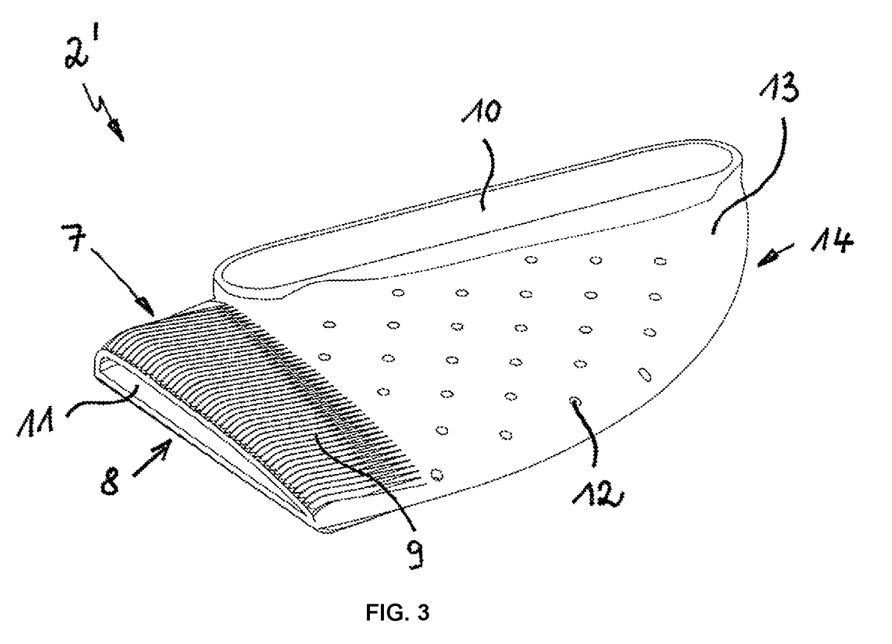
FIG. 3 shows the hot-air-slot welding nozzle from FIG. 2 in a perspective illustration in a view from above.
Figure 4:
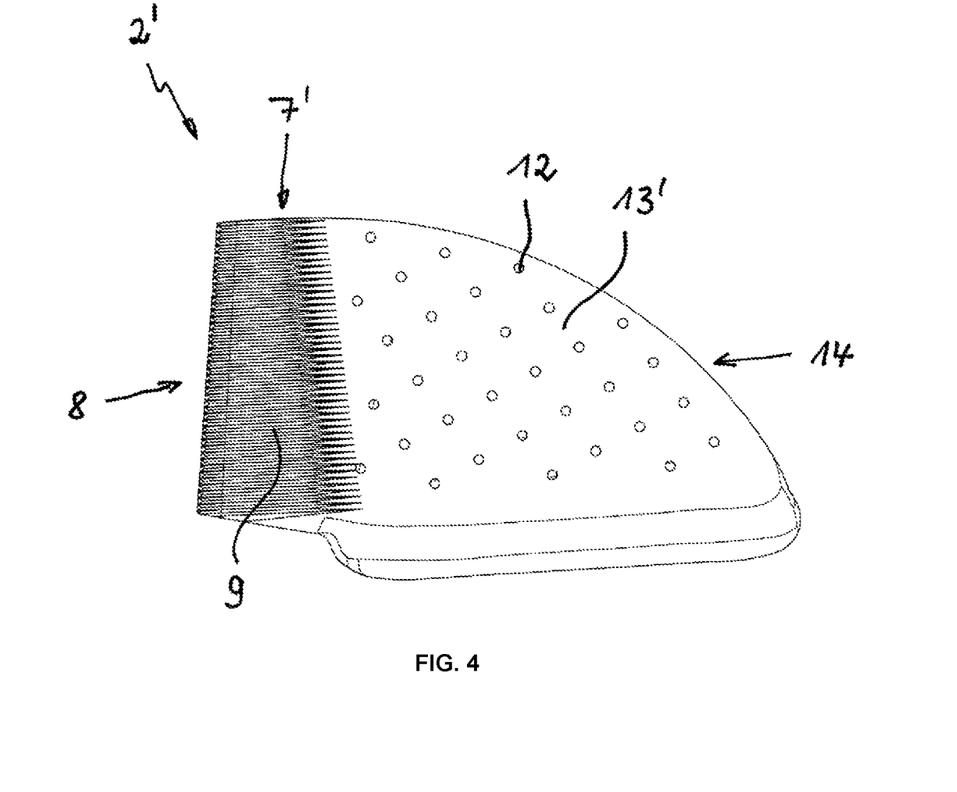
FIG. 4 shows the hot-air-slot welding nozzle from FIG. 2 in a perspective illustration in a view from beneath.

FIG. 3 shows the hot-air-slot welding nozzle 2' from FIGS. 1, 2 in a perspective illustration, in a view from above, and FIG. 4 shows the same in a perspective illustration, in a view from beneath, in an enlarged illustration, separated from the hot air blower 3. This is detachably attachable to the air outlet tube 4 of the hot air blower 3 and includes a hot air inlet opening 10, a slot-shaped welding air outlet opening 11 and multiple preheating air outlet openings 12 for hot air streams, disposed upstream of the welding air outlet opening 11 in the direction of movement of the hot-air-slot welding nozzle 2' during the welding operation, wherein the respective roughening devices 7, 7' extend transversely to the direction of movement of the hot-air-slot welding nozzle 2', adjoining the welding air outlet opening 11. The hot-air-slot welding nozzle 2' has an upper side 13 of the heating component for making contact with the upper material sheet and a lower side 13' of the heating component for making contact with the lower material sheet, including a front leading-material side 14 of the heating component in the direction of movement of the contact welding heating component 2 during the welding operation, opposite to which, and at a distance therefrom, a rear trailing-material edge 8 of the heating component for the material sheets is disposed. The leading-material side 14 of the heating component and the trailing-material edge 8 of the heating component are joined to one another by the upper side 13 of the heating component and the lower side 13' of the heating component, forming a wedge-shaped contour.

Figure 5:
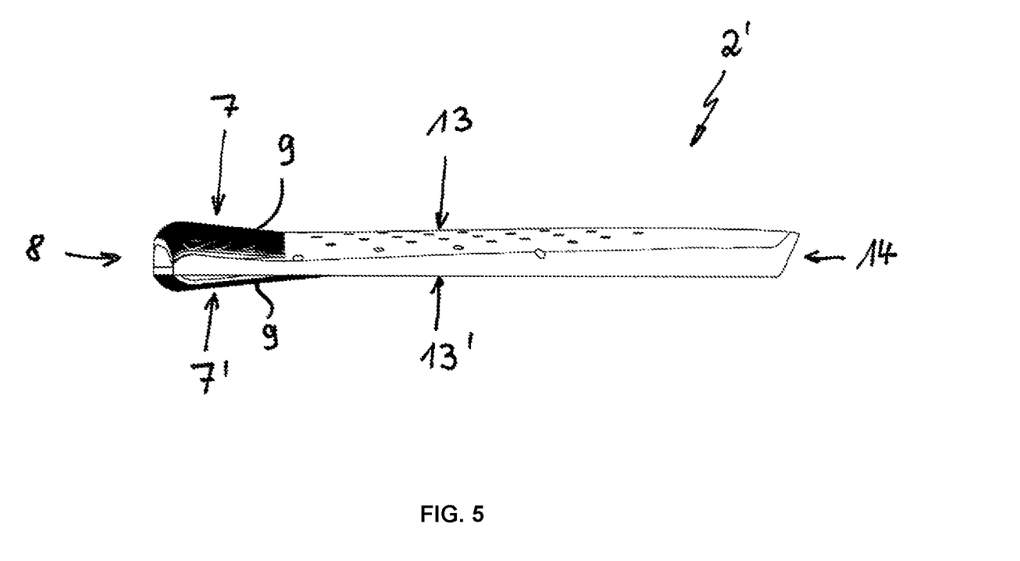
FIG. 5 shows the hot-air-slot welding nozzle from FIG. 2 in a perspective illustration in a side view.

FIG. 5, which shows the hot-air-slot welding nozzle 2' in a perspective illustration in a side view, again illustrates that the roughening devices 7, 7' for the material sheets of the contact welding heating component 2, which are disposed upstream of the trailing-material edge 8 of the heating component in the direction of movement of the hot-air-slot welding nozzle 2', protrude considerably beyond the upper side 13 of the heating component and the lower side 13' of the heating component.

According to FIGS. 3 to 5, the roughening devices 7, 7' are disposed so as to extend transversely to the direction of movement of the contact welding heating component 2, adjoining the trailing-material edge 8 of the heating component, and each comprise a number of sharp-edged raised roughening elements 9 extending in the direction of movement of the contact welding heating component 2. The roughening devices 7, 7' and the roughening elements 9 have a variable height in the direction of movement of the contact welding heating component 2, and have a maximum height in the direction of the trailing-material edge 8 of the heating component. The height of the roughening elements 9 is thus the greatest near the air outlet opening 11 of the hot-air-slot welding nozzle 2'. In the illustrated embodiment, in particular, the roughening devices 7, 7' and the roughening elements 9 have an arcuate progression in the direction of movement of the contact welding heating component 2.

Figure 6:
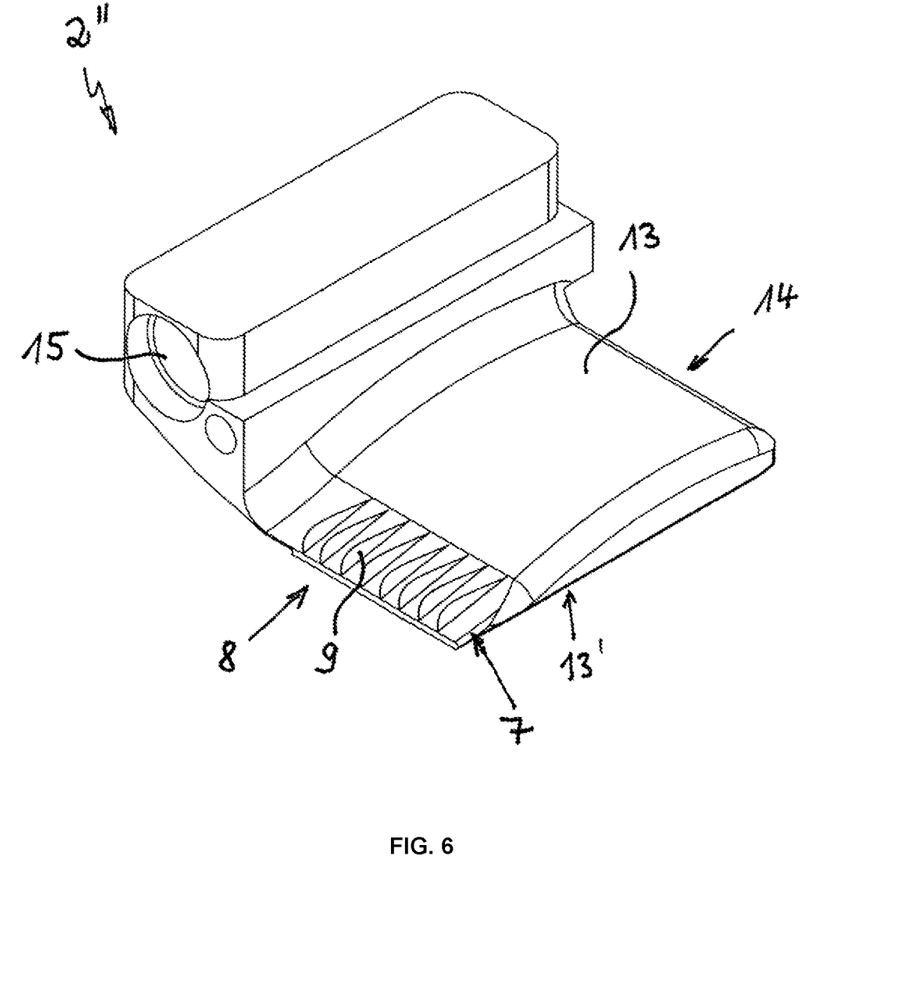
FIG. 6 shows a contact welding heating component according to the invention in the form of an electrical hot welding wedge, in a perspective illustration from above.

FIG. 6 illustrates a contact welding heating component 2 according to the invention, in the form of an electrical hot welding wedge 2", in a perspective illustration from above. The electrical hot welding wedge 2" is provided to plasticize the edges of fusible/meltable material sheets (not shown) disposed so as to overlap at least partially and, at the top, comprises a protruding roughening device 7 for the material sheets, which is disposed upstream of the trailing-material edge 8 of the heating component of the contact welding heating component 2 in the direction of movement of the contact welding heating component 2. The roughening device 7 is disposed so as to directly adjoin the trailing-material edge 8 of the heating component of the electrical hot welding wedge 2" and extend transversely to the direction of movement of the contact welding heating component 2. This comprises a number of sharp-edged raised roughening elements 9 extending in the direction of movement of the contact welding heating component 2, which act on the material sheets during plasticization thereof.

The temperature of the electrical hot welding wedge 2" can be controlled directly by way of an integral heating resistor, or indirectly by way of a cartridge heater accommodated therein. This comprises an attachment device 15 for attachment to a hand-held welding device or an automatic welding machine. The electrical hot welding wedge 2" has an upper side 13 of the heating component for making contact with the upper material sheet and a lower side 13' of the heating component for making contact with the lower material sheet, and a front leading-material side 14 of the heating component in the direction of movement of the contact welding heating component 2 during the welding operation, opposite to which, and at a distance therefrom, a rear trailing-material edge 8 of the heating component, relative to the material sheets, is disposed. The leading-material side 14 of the heating component and the trailing-material edge 8 of the heating component are joined to one another by the upper side 13 of the heating component and the lower side 13' of the heating component, forming a wedge-shaped contour. Otherwise, the roughening device 7 and the roughening elements 9 are designed as described above with respect to the hot-air-slot welding nozzle 2'.

The invention claimed is:

1. A contact welding heating component for plasticizing the edges of thermally fusible/meltable material sheets disposed so as to overlap at least partially, which can be inserted between an overlapped lower material sheet and an overlapping upper material sheet and can be moved along the same, comprising an upper side of the heating component for making contact with the upper material sheet and a lower side of the heating component for making contact with the lower material sheet, including a front leading-material side of the component in the direction of movement of the contact welding heating component during the welding operation, and a rear trailing-material edge of the heating component, for the material sheets that are joined to one another by way of the upper side of the heating component and the lower side of the heating component, forming a wedge-shaped contour, and comprising at least one roughening device for the material sheets that are disposed upstream of the trailing-material edge of the heating component in the direction of movement of the contact welding heating component, which protrudes beyond the upper side of the heating component and/or the lower side of the heating component and extends transversely to the direction of movement of the contact welding heating component, adjoining the trailing-material edge of the heating component, and comprises a number of sharp-edged raised roughening elements extending in the direction of movement of the contact welding heating component, wherein the roughening device and the roughening elements have a variable height in the direction of movement of the contact welding heating component.

2. The contact welding heating component according to claim 1, wherein the roughening device and the roughening elements have a maximum height in the direction of the trailing-material edge of the heating component.

3. The contact welding heating component according to claim 1, wherein the roughening devices and the roughening elements have an arcuate progression in the direction of movement of the contact welding heating component.

4. The contact welding heating component according to claim 1, wherein the roughening device and the roughening elements are interrupted in the direction of movement of the contact welding heating component.

5. The contact welding heating component according to claim 1, wherein the roughening device and the roughening elements are interrupted perpendicularly to the direction of movement of the contact welding heating component.

6. The contact welding heating component according to claim 1, wherein the roughening device and the roughening elements have a variable height perpendicularly to the direction of movement of the contact welding heating component.

7. The contact welding heating component according to claim 6, wherein the height of the roughening device and of the roughening elements decreases from the outside to the inside perpendicularly to the direction of movement of the contact welding heating component.

8. The contact welding heating component according to claim 1, wherein the contact welding heating component is made of metal and produced entirely or partially by way of a 3D metal printing method or entirely or partially by way of a laser sintering and/or laser melting method.

9. The contact welding heating component according to claim 1, wherein the contact welding heating component comprises a supporting brace on the inside between the upper side of the heating component and the lower side of the heating component.

10. The contact welding heating component according to claim 1, wherein the contact welding heating component is a hot-air-slot welding nozzle or an electrical hot welding wedge.

11. The contact welding heating component according to claim 10, wherein the contact welding heating component is a hot-air-slot welding nozzle and the hot-air-slot welding nozzle includes a hot air inlet opening, at least one slot-shaped welding air outlet opening, and at least one preheating air outlet opening for a hot air stream disposed upstream of the welding air outlet opening in a direction of movement of the hot-air-slot welding nozzle during the welding operation, and wherein the roughening device extends transversely to the direction of movement of the hot-air-slot welding nozzle, adjoining the welding air outlet opening.

12. The contact welding heating component according to claim 10, wherein the roughening elements extend from the preheating air outlet opening to the welding air outlet opening.

13. The contact welding heating component according to claim 10, wherein the contact welding heating component is an electrical hot welding wedge the electrical hot welding wedge is electrically heated directly or indirectly, and wherein the roughening device extends transversely to the direction of movement of the electrical hot welding wedge, adjoining the trailing-material edge of the heating component.

14. An automatic welding machine for joining the edges of thermally fusible/meltable material sheets disposed so as to overlap at least partially, comprising a contact welding heating component, which can be inserted between an overlapped lower material sheet and an overlapping upper material sheet for plasticization of the material sheets and can be moved along the same, comprising a contact welding heating component according to claim 1.

* * * * *